Oct. 22, 1963 T. L. DIMOND 3,108,254
MACHINE READING OF HANDWRITTEN CHARACTERS
Filed Aug. 14, 1957 9 Sheets-Sheet 1
FIG. 1
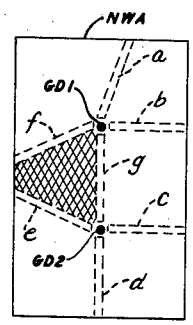
FIG. 2
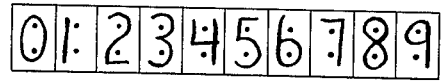
FIG. 4
| STOCK NUMBER | 276 - 4359 - 61 | | |
|---|---|---|---|
| LOCATION | : 36 | STOCKROOM | 424 |
| NOTES | | AREA | : 72 |
| | | SHELF | : 12 |
| | | BIN | : 27 |
| DATE | QUANTITY |
|---|---|
| 12/15/55 | 560,732 |
| 12/17/56 | 432,648 |
| 12/14/57 | 295,120 |
FIG. 3
| NUM-ERAL | CRITERION AREA |||||||
|---|---|---|---|---|---|---|---|
| | a | b | c | d | e | f | g |
| 0 | x | x | x | x | x | x | |
| 1 | | | | | x | x | |
| 2 | x | x | | x | x | | x |
| 3 | x | x | x | x | | | x |
| 4 | | x | x | | | x | x |
| 5 | x | | x | x | | x | x |
| 6 | | | x | x | x | x | x |
| 7 | x | x | x | | | | |
| 8 | x | x | x | x | x | x | x |
| 9 | x | x | x | | | x | x |
INVENTOR
T.L. DIMOND
BY
Kenneth B Hamlin
ATTORNEY Oct. 22, 1963  T. L. DIMOND  3,108,254
MACHINE READING OF HANDWRITTEN CHARACTERS
Filed Aug. 14, 1957  9 Sheets-Sheet 2

FIG. 6

| LETTER | CRITERION AREAS | | | | | | | | | | | |
|---|---|---|---|---|---|---|---|---|---|---|---|---|
| | a | b | c | d | e | f | g | h | i | j | k | l |
| A | | | | | x | x | | x | | x | x | x |
| B | | | | | x | x | | x | x | x | x | x |
| C | | | | | | | | x | x | x | x | |
| D | | | | | x | x | | x | x | x | x | |
| E | | | | | | | | x | x | x | x | x |
| F | | | | | | | | x | | x | x | x |
| G | | | | | x | | | x | x | x | x | x |
| H | | | | | x | | | | | x | x | x |
| I | | | | | | | | | | x | x | |
| J | | | | | x | x | | | x | x | | |
| K | | | | | x | x | | | x | x | x | |
| L | | | | | | | | | x | x | x | |
| M | x | x | x | | | x | | x | | x | x | |
| N | | x | x | | x | x | x | | | | | |
| O | x | x | x | x | x | x | | | | | | |
| P | x | x | | | x | x | x | | | | | |
| Q | x | x | x | x | x | x | x | | | | | |
| R | x | x | x | | x | x | x | | | | | |
| S | x | | x | x | | x | x | | | | | |
| T | x | | | | x | x | | x | | | | |
| U | | x | | | | x | x | | | | | |
| V | | x | x | x | x | x | | | | | | |
| W | | x | x | x | x | | | x | x | x | | |
| X | x | | | x | x | x | | x | x | | | |
| Y | | x | | | x | x | x | | | | | |
| Z | x | x | | x | x | | x | | | | | |

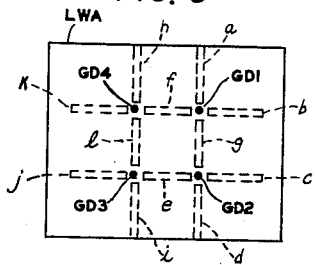

DATE 12/14/57    :: :: :: OUT

FROM :S:Y:M:T:::, N:J:

C.O. C:R:3 : : : :: :: ::

NO. 4163 : : : :: :: ::

TO D:E:N:V:E:R::, C:O:L:

C.O. E:N:: 5 : : : : :: ::

NO. 7843 : : : :: :: ::

:: :: ::

MINUTES  : : 3.5

CHARGE $: 5.75

INVENTOR
T.L. DIMOND
BY
*Kenneth B Hamlin*
ATTORNEY

Oct. 22, 1963  T. L. DIMOND  3,108,254
MACHINE READING OF HANDWRITTEN CHARACTERS
Filed Aug. 14, 1957  9 Sheets-Sheet 3

FIG. 10

| LETTER | CRITERION AREAS | | | | | | | |
|---|---|---|---|---|---|---|---|---|
| | a | b | c | d | e | f | g | v |
| B | x | x | x | x | x/% | | x | x |
| D | x | x | x | x | | | | x |
| E | x | | | x | x/% | | | x |
| F | x | | | | x/% | | | x |
| R | x | x | x | | x/% | | x | x |
| P | x | x | | | x/% | | x | x |
| K | x | | x | | x/% | x | x | x |
| K | x | | | x | x/% | x | | x |
| N | | x | x | x | x | x/% | | x |
| U | | x | x | x | | | | x |
| M | | x | x | | x/% | x | x | x |
| H | | x | x | | x/% | | x | x |
| L | | | | x | | | | x |
| I | | | | | | | | x |
| Q | x | x | x | x | x | x | x | |
| O | x | x | x | x | x | x | | |
| S | x | x/% | x | x | | x | x | |
| A | x | x | x | | x | x | x | |
| W | x | x | x | | x | x | | |
| T | x | x | x | | | | | |
| T | x | | | | x | x | | |
| Z | x | x | | x | x | | x | |
| G | x | | x | x | x | x | x | |
| C | x | | x | x | x | | | |
| V | | x | x | x | x | x | | |
| J | | x | x | x | x/% | | | |
| X | | x | x | | x | x | x | |
| Y | | x | x | | | x | x | |
| Y | | x | | | x | x | x | |

FIG. 8

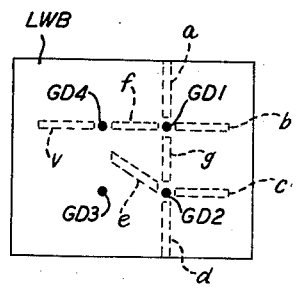

FIG. 9

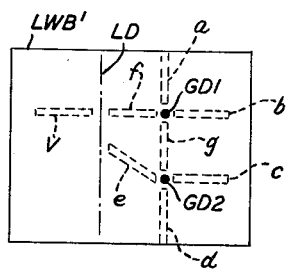

INVENTOR
T. L. DIMOND
BY
Kenneth B Hamlin
ATTORNEY

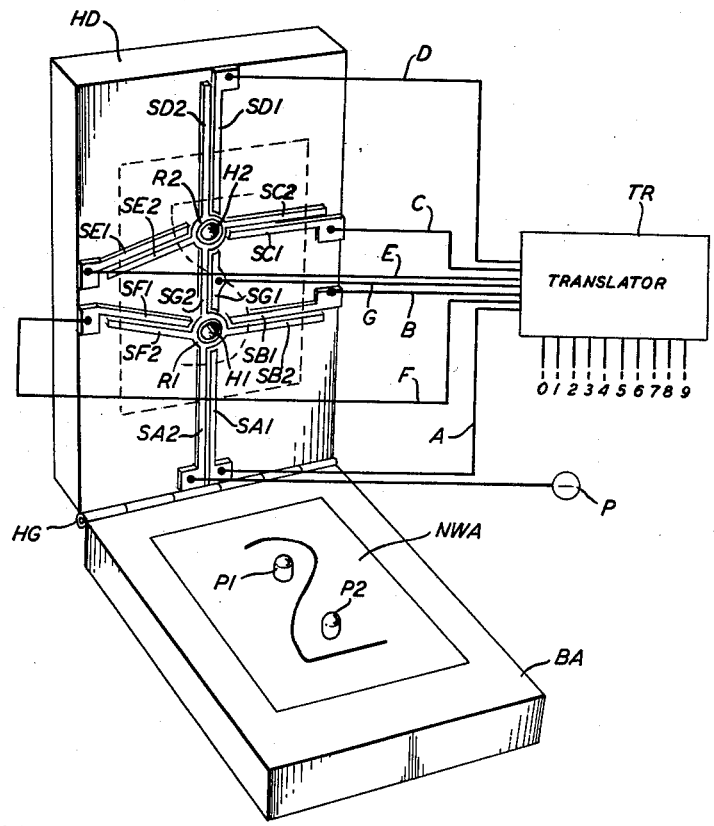
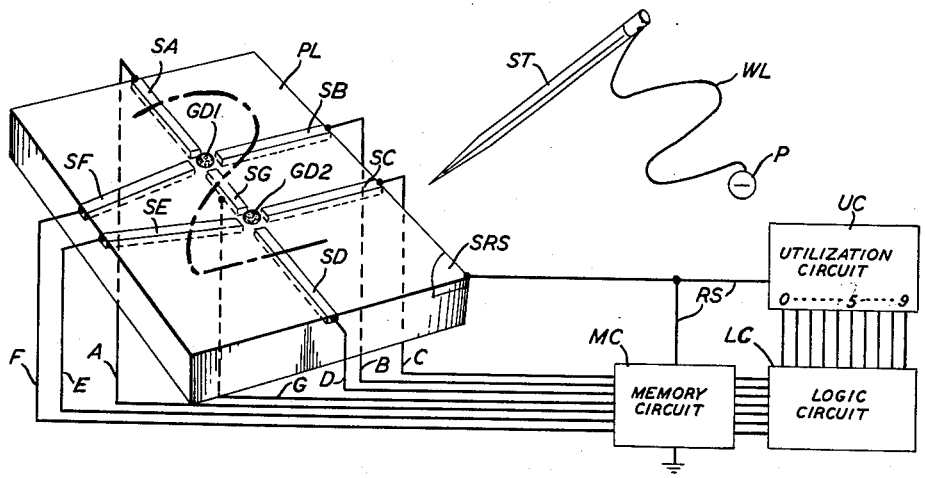

Oct. 22, 1963            T. L. DIMOND            3,108,254
MACHINE READING OF HANDWRITTEN CHARACTERS
Filed Aug. 14, 1957            9 Sheets-Sheet 5
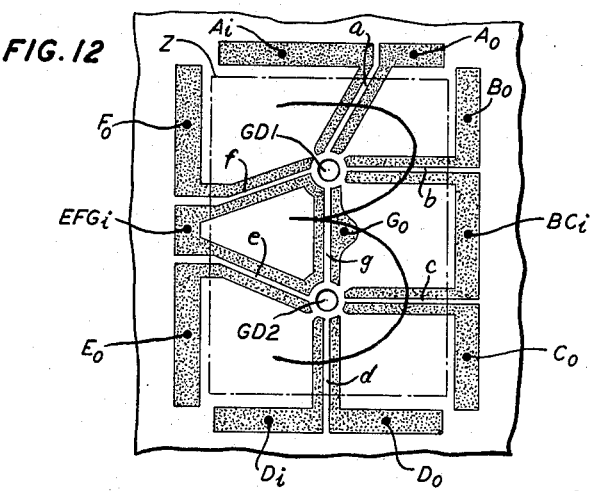
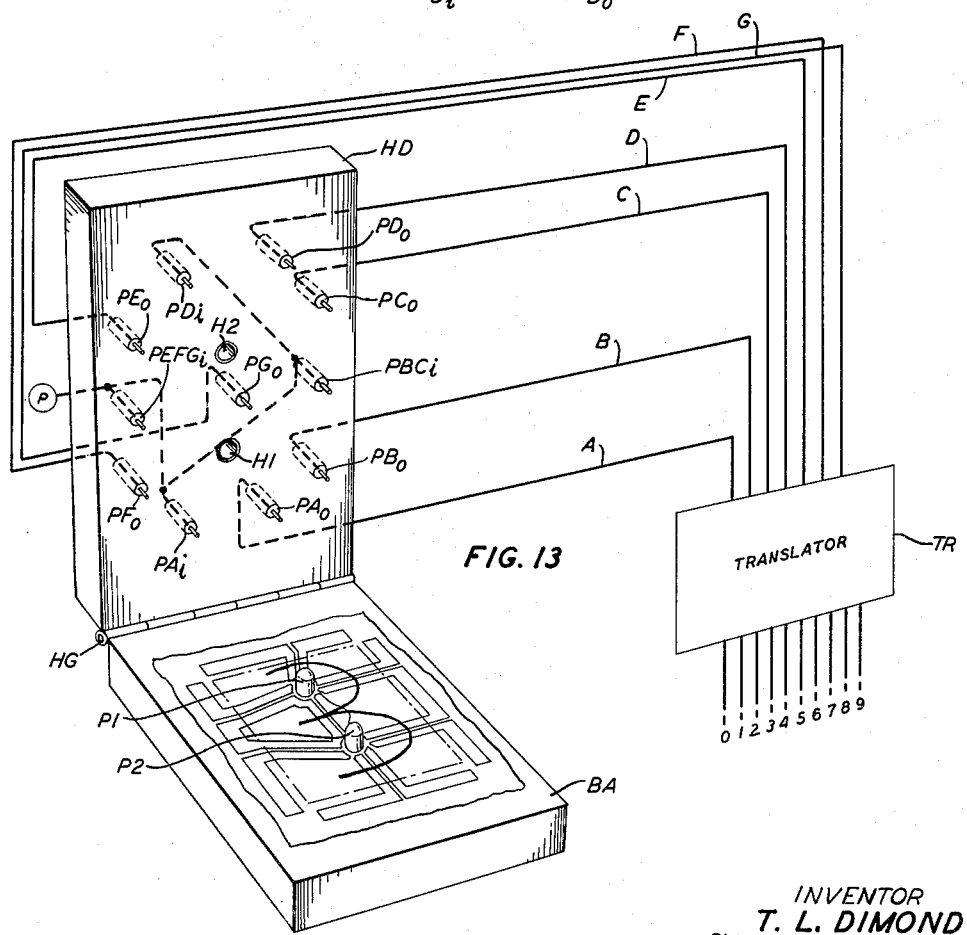
INVENTOR
T. L. DIMOND
BY
ATTORNEY Oct. 22, 1963 T. L. DIMOND 3,108,254
MACHINE READING OF HANDWRITTEN CHARACTERS
Filed Aug. 14, 1957 9 Sheets-Sheet 7

INVENTOR
T. L. DIMOND
BY
Kenneth B Hamlin
ATTORNEY

INVENTOR
T. L. DIMOND
BY
Kenneth B Hamlin
ATTORNEY

3,108,254
MACHINE READING OF HANDWRITTEN CHARACTERS

Thomas L. Dimond, Chatham, N.J., assignor to Bell Telephone Laboratories, Incorporated, New York, N.Y., a corporation of New York
Filed Aug. 14, 1957, Ser. No. 678,213
16 Claims. (Cl. 340—146.3)

This invention relates to methods and apparatus for writing and automatically reading handwritten characters and more specifically to methods and apparatus for writing and automatically reading Arabic numerals and alphabetical letters and effecting the control of machines in response thereto.

Nearly all of the information used for instructing machines originates in the mind of man and must be communicated to machines by physical means or devices. For example, operational instructions may be directly communicated to machines by the manual operation of such conventional devices as switches, keys, dials or levers. Where it is desired to control the operation of a machine by means of a stored program, these operational instructions or information must be translated into machine language and stored in a suitable storage medium. The machine language information stored in the storage medium is then read by suitable devices and the control of a plurality of successive operations of the machine is effected in response thereto. The storage medium may, for example, be a paper tape in which instructions are recorded in the form of coded perforations. The translation of the control information into machine language and the perforation of this machine language in the paper tape is accomplished by operators utilizing well known key-operated tape perforators. The prepared tape is then passed through a tape reader and tape transmitter which reads the coded perforations and transmits appropriate control signals to the machine.

With the introduction of the modern high-speed computer and data processing systems in business office operations, many of the clerical operations performed heretofore by hand are now being performed automatically by such machines. A major problem associated with the mechanization of data processing operations is the conversion of the information entering into such operations into machine language which can be automatically read and understood by machines. A portion of the information originates in the form of printed or typewritten characters such as, for example, the printed figures or letters from typewriters, cash registers, time clocks, ticket-printing machines, etc. Normally the translation of this information into machine language capable of being utilized to control computers or data processing systems has been accomplished by operators utilizing such devices as keypunch sets, type-to-tape converters, etc., to translate the typewritten or printed information into coded perforations in cards or paper tape or coded signals recorded on magnetic tapes. Still another portion of the information which must enter into data processing operations originates as handwritten characters on sales slips, customer receipts, payment stubs, checks, etc. This information, like typewritten or printed information, must be translated into machine language capable of being utilized to control computers and data processing systems into which it is to be entered.

Devices have been proposed heretofore which will automatically read and interpret printed or typewritten characters and automatically translate this information into machine language. Thus the costly and time-consuming operation of manually translating the printed or typewritten characters into machine language has been eliminated, and concomitantly the efficiency of data processing systems has been increased, the cost of processing data decreased, and the possibility of human errors eliminated.

Because of variations in size, shape and orientation of handwritten Arabic numerals and handwritten alphabetical letters, however, it has heretofore been impossible to automatically read these characters and to automatically control machines in response thereto with any degree of accuracy. Thus the translation of handwritten information into machine language has heretofore been performed manually by operators utilizing conventional key sets. Where the information is vital, experience has shown that this information must be keyed a second time to verify the accuracy of the translation. In a good many cases the cost of manually translating handwritten information into machine language is such that it is more economical to process the information by hand rather than to translate it into machine language for automatic machine processing.

To alleviate this problem in data processing systems it has been proposed heretofore that special machine-readable handwritten symbols be utilized by clerical personnel, sales personnel or other personnel, completing the sales slips, customer receipts, payment stubs, etc., which are to be processed in a data processing system. These special handwritten symbols may be directly read by machines, and accordingly the time-consuming operation of manually translating this information on a key set is eliminated. The utilization of special handwritten machine-readable symbols, however, presents other difficulties. Because these symbols are foreign to the normal writing habits of sales personnel or clerical personnel, it is necessary that these people learn a new system of notation, and as a result thereof the efficiency, speed and facility with which these special machine-readable symbols are handwritten on sales slips, payment stubs, etc., are greatly decreased and the tendency for errors is greatly increased. Furthermore, it is advantageous to have the information representing sales transactions, payments, etc., handwritten in a form which is easily read by a customer or the general public, and accordingly these special handwritten machine-readable symbols fail to fulfill this requirement.

It has also been proposed heretofore to utilize a mark-detection method of writing information by hand in machine-readable language. In this type of notation the person entering the record places marks on a record, such as a card, at predetermined locations to indicate in coded form the desired information. This of course also suffers the disadvantage that the general public cannot easily read and interpret the marks, and furthermore the writing of such marks is considerably slower and more susceptible to errors than the normal writing of Arabic numerals or alphabetical letters by hand. The mark-detection method of handwriting in a machine language also suffers the disadvantage that considerably more space is required to record information in mark-detection codes.

It is thus apparent that the necessity for manually translating handwritten information on sales slips, receipts, payment stubs, etc., into machine language has prevented the complete mechanization of data processing in many business offices and industries. Accordingly, the data processing systems employed in many of the business offices and industries cannot be utilized with maximum efficiency and the optimum reduction in the cost of processing data by mechanization cannot be attained. This "bottleneck" in the mechanized processing of data is particularly serious when a rapid analysis of the data is desired. Modern high-speed computers and data processing systems are capable of processing data at high rates of speed but in many cases this high rate cannot be achieved because the processing of the data is dependent upon the slow and costly manual translation of the data into machine language prior to automatic processing.

It is an object of the present invention to increase the efficiency and reliability and to reduce the cost of processing data in data processing systems.

It is also an object of the present invention to provide a new and improved means for communicating information to a machine.

It is a further object of the present invention to eliminate manual translating operations heretofore required in the communication of handwritten information to machines.

It is an additional object of the present invention to provide a simple, economical and accurate reader for automatically reading alphabetical letters and Arabic numerals.

These and other objects of the present invention are attained in specific embodiments thereof wherein the size, shape and orientation of handwritten Arabic numerals and alphabetical letters (hereinafter referred to as alpha-numeric characters) are controlled so as to advantageously be automatically and accurately readable by relatively simple reading means. In accordance with this aspect of the present invention, limited control of the hand writing of alpha-numeric characters is attained by utilizing a defined writing area containing a plurality of visible guide indicia with respect to which the characters are written. The constriction imposed upon the writer is nominal and accordingly does not interfere with his normal writing habits. Considerable latitude is permissible in the hand writing of the characters while maintaining a high degree of accuracy from the automatic reading means. Thus, in accordance with the present invention, it is not necessary for writers to learn and master a new and unfamiliar numbering system or set of alphabetical symbols but may utilize conventional Arabic numerals and alphabetical letters to write by hand in a machine-readable language.

With the hand writing of Arabic numerals and alphabetical letters in a form adapted for machine reading in accordance with the present invention, another aspect of the invention is directed to a document reader employed to automatically read alpha-numeric characters previously written by hand. In accordance with this aspect of the present invention, this is accomplished by detecting the presence of marks in a plurality of criterion areas in the defined writing area in which the characters were written. The identity of the previously written character is thus determined and coded signals corresponding thereto are produced. In this manner sales slips, customer receipts, payment stubs, etc., upon which handwritten alpha-numeric characters are written in the controlled manner described above, may be automatically read and translated into machine language to permit such documents to be automatically processed in data processing systems. Accordingly, this aspect of the present invention makes possible the automatic processing of sales slips, customer receipts, payment stubs, et cetera, containing handwritten information in data processing systems without the necessity, required heretofore, of separately translating the handwritten information into machine-readable language.

Still another important aspect of the present invention is directed to a real time reader for reading handwritten alpha-numeric characters while such characters are being written. The real time reader of the present invention is in actuality an automatic "pencil reader" because it reads and translates into machine-readable coded signals alpha-numeric characters written by hand while the characters are being written. This is accomplished in accordance with this aspect of the present invention by describing the characters on a platen containing a plurality of electrically conducting segments, utilizing an electrically conducting stylus, determining which of the segments are traversed by the stylus in describing the character and producing coded signals representing the described characters. Thus in accordance with this aspect of the present invention, it is possible to communicate operational instructions to a machine, to apply intelligence to a transmission line, to supply information data to the input of a data processing system, et cetera, by the simple expedient of writing alpha-numeric characters on a specially designed platen.

According to still another aspect of the present invention, the above-described real time reader may advantageously be arranged to produce a written record of the alpha-numeric characters described thereon by hand. This is accomplished by equipping the reader with a stylus containing electrically conducting writing material such as electrically conducting ink or electrically conducting lead and arranging an insulating material such as paper over the electrically conducting segments on the platen of the reader. As each character is described by hand on the paper, the electrically conducting writing material in the stylus will deposit a trace of the described character on the paper, and by means of capacitance coupling through the paper between the segments of the platen and the stylus, the segments traversed in describing the character may be determined and coded signals representative thereof produced. In this manner, control instructions may be communicated to machines or intelligence applied to transmission lines by the hand writing of Arabic numerals and alphabetical letters and at the same time, produce a written record of the information.

It is a feature of the present invention to control the hand writing of alpha-numeric characters to adapt said characters for automatic machine reading.

It is another feature of the present invention to automatically read alpha-numeric characters previously written by hand.

It is a further feature of the present invention to automatically read and translate into machine-readable coded signals, alpha-numeric characters previously written by hand on paper or on other suitable writing surfaces.

It is an additional feature of the present invention to communicate information to machines by the hand writing of alpha-numeric characters.

It is a further feature of the present invention to automatically read and translate into machine-readable coded signals alpha-numeric characters described by hand while said characters are being described.

It is a further feature of the present invention to automatically read and translate into machine-readable coded signals alpha-numeric characters described by hand while said characters are being described and simultaneously make a handwritten record of the described characters.

It is an additional feature of the present invention to hand write alpha-numeric characters in a defined writing area with respect to visible indicia therein and to automatically determine the identity thereof by sensing predetermined criterion areas in said defined writing area.

The foregoing and other objects and features of the present invention will be more readily understood from the following description of illustrative embodiments thereof when read in reference to the accompanying drawing in which:

FIG. 1 depicts an illustrative embodiment of a defined writing area for the hand writing of machine-readable Arabic numerals in accordance with the present invention;

FIG. 2 shows an illustrative manner in which the Arabic numerals 0 through 9 are hand written in the defined writing area of FIG. 1;

FIG. 3 is a table showing the criterion areas traversed by each of the Arabic numerals 0 through 9 when hand written in the manner shown in FIG. 2 in the defined writing area of FIG. 1;

FIG. 4 depicts a typical stock inventory card adapted for the hand writing of machine-readable Arabic numerals in accordance with the present invention;

FIG. 5 depicts an illustrative embodiment of a defined writing area for the hand writing of machine-readable alphabetical letters in accordance with the present invention;

FIG. 6 is a table showing an illustrative manner in which the alphabetical letters A through Z are hand written in the defined writing area of FIG. 5 and the criterion areas in the defined writing area of FIG. 5 traversed thereby;

FIG. 7 depicts a typical toll ticket of the type utilized by telephone operators to record data for toll telephone calls which has been adapted for the hand writing of alphabetical letters and Arabic numerals in accordance with the present invention;

FIG. 8 depicts another illustrative embodiment of a defined writing area for the hand writing of machine-readable alphabetical letters in accordance with the present invention;

FIG. 9 depicts still another illustrative embodiment of a defined writing area for the hand writing of machine-readable alphabetical letters in accordance with the present invention;

FIG. 10 is a table showing an illustrative manner in which the alphabetical letters A through Z are hand written in the defined writing areas of FIGS. 8 and 9 and the criterion areas in the defined writing areas of FIGS. 8 and 9 traversed thereby;

FIG. 11 depicts an illustrative embodiment of a document reader for reading previously written handwritten Arabic numerals in accordance with the present invention;

FIG. 12 depicts a defined writing area of the type shown in FIG. 1 wherein the criterion areas are physically defined on the writing surface in accordance with the present invention;

FIG. 13 depicts another illustrative embodiment of a document reader for reading handwritten Arabic numerals previously written in the defined writing area of FIG. 12;

FIG. 14 depicts an illustrative embodiment of a real time reader in accordance with the present invention for automatically reading handwritten Arabic numerals while such numerals are being written;

Figure 15:
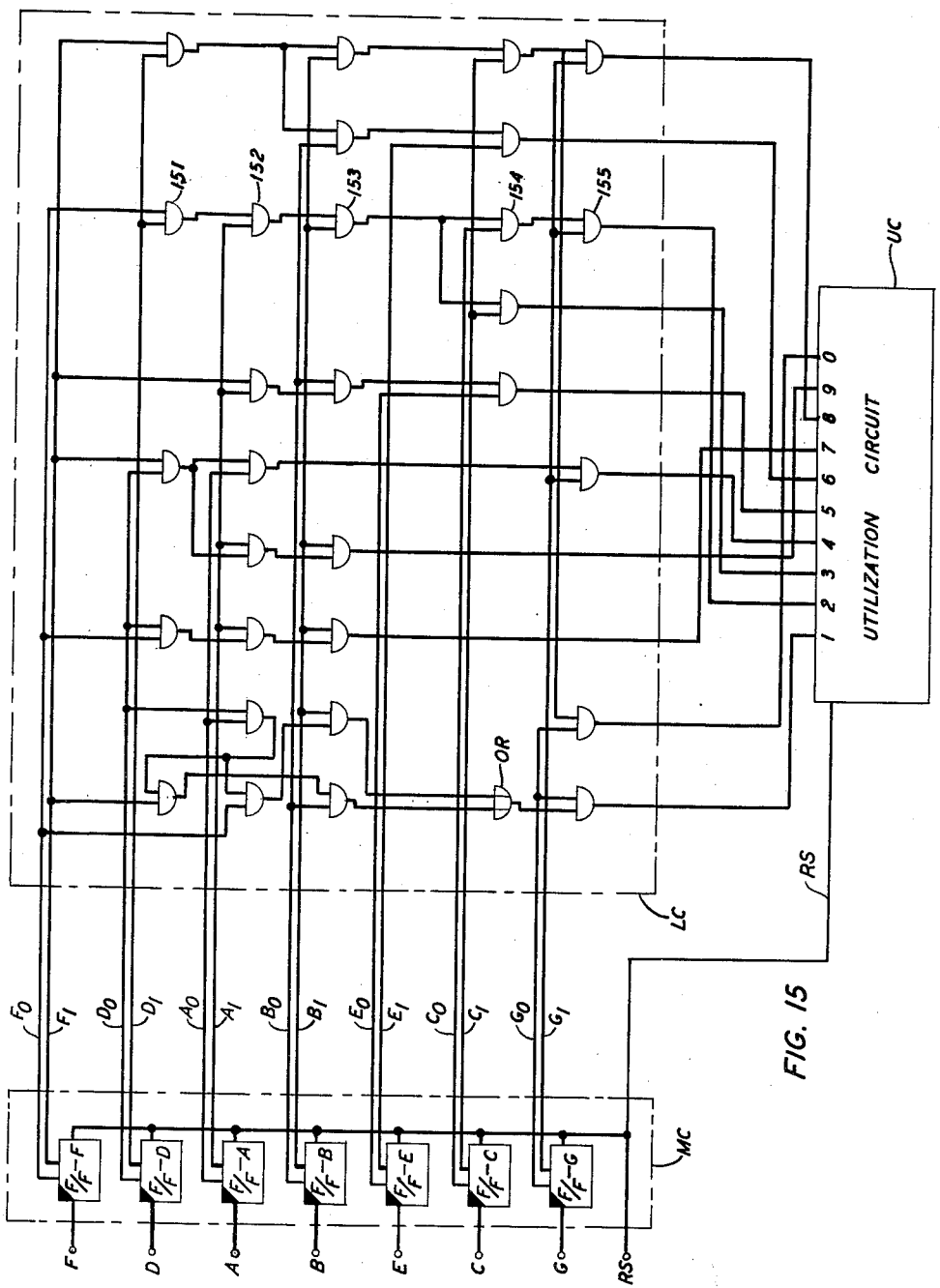
FIG. 15 depicts an illustrative embodiment of a memory circuit and logic circuit employable in the combination of the real time reader of FIG. 14.

Turning now to the drawing, FIGS. 1 and 2 depict one illustrative embodiment of the manner, in accordance with the present invention, in which the hand writing of Arabic numerals may advantageously be controlled to adapt the handwritten numerals for automatic machine reading. FIG. 1 shows an enlargement of a defined writing area NWA in which each of the individual Arabic numerals "0" through "9" are written. Within the defined writing area NWA are located two guide dots, GD1 and GD2, about which the Arabic numerals are written. Guide dots GD1 and GD2 may be printed on the writing surface within the defined writing area NWA as shown or they may be perforated holes in the writing surface itself, or slight protuberances on the writing surface. In accordance with the present invention, the writer is instructed to form the Arabic numerals about guide dots GD1 and GD2 in the manner shown in FIG. 2, to keep the numerals within the border of the defined writing area, to avoid crossing the guide dots, to keep the beginnings and ends of pencil strokes out of the shaded area in the defined writing area shown in FIG. 1 and to write an open-topped four. It will thus be observed that the constriction placed upon the writer is nominal and that the hand writing of the Arabic numerals "0" through "9" conforms, in general, to the normal writing habits of the majority of people.

By controlling the size, shape and orientation of handwritten Arabic numerals in the manner described above, the numerals are adapted for automatic machine reading. As will be described in detail hereinafter, this is accomplished by sensing or scanning predetermined criterion areas in the defined writing area NWA for the presence of a pencil mark therein. Illustrative criterion areas are shown dotted in FIG. 1 and are designated $a$ through $g$ inclusive. Thus, if the numeral "2" is handwritten in the manner shown in FIG. 2 in a defined writing area of the type shown in FIG. 1, the criterion areas $a$, $b$, $g$, $e$ and $d$ will be traversed by a pencil mark made when the numeral is written. The detection of the fact that these particular criterion areas were traversed uniquely identifies the handwritten numeral as the Arabic numeral "2."

FIG. 3 is a table showing the Arabic numerals "0" through "9" and the criterion areas $a$ through $g$ traversed thereby when these numerals are written by hand on defined writing areas of the type shown in FIG. 1. An "X" in the table of FIG. 3 indicates that a particular criterion area was traversed when the numeral was written by hand, and a blank or the absence of an "X" indicates that a particular area was not traversed. Referring to the table, it will be observed that when the numeral "7" is written, for example, a pencil mark describing this numeral will traverse criterion areas $a$, $b$ and $c$. Similarly, when the numeral "0" is written, a pencil mark describing the "0" will traverse criterion areas $a$, $b$, $c$, $d$, $e$ and $f$ in the defined writing area. It will be noted, referring to FIG. 3, that each of the Arabic numerals traverses a different and distinctive combination of the criterion areas in the defined writing area NWA, and thus the detection or determination of the particular areas which are traversed uniquely identifies the handwritten numeral.

It will be further noted that not all of the possible combinations of criterion areas $a$ through $g$ are utilized in the table of FIG. 3 to identify handwritten numerals. Other alternative combinations may also be utilized for certain of the numerals. For example, the Arabic numeral "1" may also be uniquely identified if it traverses criterion areas $b$ and $c$ to the right of guide dots GD1 and GD2. Also, the Arabic numeral "2" may still be uniquely identified even though it traverses criterion area $f$. Similarly, the numeral "2" may be uniquely identified if it traverses criterion area $c$ and not $f$. These alternative combinations make possible a greater latitude in the handwriting of numerals and correspondingly reduce the degree of constriction imposed upon the writer.

The placing of specific defined boundaries on the individual writing area NWA for each of the numerals to be handwritten may advantageously be eliminated by spacing the two guide dots GD1 and GD2 for each numeral far enough from the adjacent pair of guide dots to insure that a numeral handwritten about one pair of guide dots will not traverse the criterion areas associated with the adjacent pair of guide dots. Thus, in effect, the writing area for each numeral although not visibly defined is in fact physically defined by the two guide dots GD1 and GD2 and these guide dots are all that are required to control the hand writing of Arabic numerals for machine reading purposes.

An illustrative example of the "guided Arabic" method of writing machine-readable handwritten numerals in accordance with the present invention is shown in FIG. 4 wherein a typical stock inventory card is advantageously adapted for the writing of handwritten numerical inventory information. The completed inventory card is thus adapted for subsequent processing by automatic data processing machines. The inventory taker completes the inventory card by hand writing the stock number, the location, the date and the determined quantities in the appropriate indicated places on the card with respect to the pairs of guide dots indicated thereon. This stock card may then be processed in the manner to be described hereinafter by automatic reading means which can read and process the handwritten numerical information written thereon.

FIGS. 5 and 6 depict one illustrative embodiment of the manner, in accordance with the present invention, in which the hand writing of alphabetical letters may advantageously be controlled to adapt the handwritten letters for automatic machine reading. FIG. 5 shows an enlargement of a defined writing area LWA in which each of the individual alphabetical letters are written. Within the defined writing area LWA are located four guide dots, GD1 through GD4, about which the alphabetical letters are written. These guide dots, like the guide dots discussed above with respect to FIG. 1, may be printed on the writing surface, may be perforated holes in the writing surface, or may be slight protuberances pressed in or otherwise placed on the writing surface. The writer is instructed to utilize standard drafting symbol capital letters and to hand write these letters with respect to guide dots GD1 through GD4 as shown in FIG. 6 except that "H" is like lower case "h," "Q" is similar to Greek capital letter theta, "θ," and "U" is made around guide dot GD1. Letters from "A" to "L" inclusive are written around the left-hand guide dots GD3 and GD4, and the rest of the letters are written around the right-hand guide dots GD1 and GD2, with the exception of the wide letters "M," "W" and "T," which are written around both sides of dots, and the letter "X" which is written between the pair of guide dots GD1—GD2 and GD3—GD4. Thus the constraint imposed upon the writer of the letters is at a minimum and familiar alphabetical letters may be written in all cases except as indicated above.

By controlling the size, shape and orientation of the alphabetical letters in the manner described above and as shown in FIG. 6, these letters are adapted for automatic machine reading. As will be described in detail hereinafter, the identity of an alphabetical letter handwritten in the manner described above may advantageously be determined by sensing criterion areas in the defined writing area LWA. Illustrative criterion areas are shown dotted in FIG. 5 and are designated $a$ through $l$. Thus if the letter "A" is handwritten in the manner shown in FIG. 6 in a defined writing area of the type shown in FIG. 5, criterion areas $k$, $j$, $h$, $f$, $e$ and $l$ will be traversed by the pencil mark made when the letter is written. FIG. 6 is a table showing the alphabetical letters "A" through "Z" and the criterion areas $a$ through $l$ traversed thereby when these letters are written by hand on defined writing areas of the type shown in FIG. 5. The "X's" in the various criterion area columns indicate that a particular criterion area was traversed and the blanks or absence of "X's" indicate that a particular criterion area was not traversed when a particular letter was written. Referring to the table of FIG. 6, it will be noted that each of the alphabetical letters traverses a different and distinctive combination of criterion areas in the defined writing area LWA, and thus the detection or determination of the particular areas which are traversed uniquely identifies the handwritten letter.

It will also be noted that not all of the possible combinations of criterion areas $a$ through $l$ are utilized in the table of FIG. 6. Thus alternative combinations may advantageously be utilized in the manner described above in connection with FIG. 3 to uniquely identify handwritten letters traversing different combinations of criterion areas than the combinations shown in FIG. 6. In this manner the constriction imposed upon the writer in writing the letters may advantageously be further reduced.

As described above with respect to FIGS. 1 and 2, the boundaries defining writing area LWA shown in FIG. 5 may advantageously be eliminated provided the sets of guide dots GD1 through GD4 are spaced far enough apart from the adjacent sets of guide dots to insure that a letter handwritten on one set of guide dots will not traverse criterion areas associated with an adjacent set of guide dots. Thus, in effect, the writing area for each letter although not visibly defined is in fact physically defined by the four guide dots GD1 through GD4 and these guide dots are all that are required to control the hand writing of alphabetical letters for machine reading purposes.

FIG. 7 depicts an illustrative example wherein both the "double dot" method of guiding the hand writing of Arabic numerals and the "four dot" method of guiding the hand writing of alphabetical letters may be utilized to adapt both handwritten Arabic numerals and handwritten alphabetical letters for automatic machine reading. FIG. 7 shows a portion of a typical toll ticket of the type completed by toll telephone operators in the establishment of long distance telephone calls. By adapting this toll ticket for the guided hand writing of alpha-numeric characters as described hereinbefore with the placement of appropriate sets of guide dots, the operator may then hand write on toll ticket machine-readable alpha-numeric characters identifying the town and state from which a call originated, the central office and telephone number originating the call, the town and state where the called party is located, the central office and the directory number of the called party, the duration of the conversation in minutes, and the charge for the call. Other information as required may also advantageously be written on the toll ticket in a similar manner. A toll ticket completed in this manner may advantageously be read in the manner to be described hereinafter and processed in an automatic data processing system. Thus the necessity heretofore required of manually translating the handwritten information on the toll ticket into a machine-readable language is thereby eliminated.

A further illustrative embodiment of the manner, in accordance with the present invention, in which the hand writing of alphabetical letters may alvantageously be controlled to adapt the handwritten letters for automatic machine reading is depicted in FIGS. 8, 9 and 10. This method is similar to the method described hereinbefore with respect to FIGS. 5 and 6. However, in the embodiment shown in FIGS. 8, 9 and 10, a natural characteristic found in the twenty-six letters of the alphabet is advantageously utilized. The left-hand portion of thirteen of the twenty-six letters of the alphabet is a vertical line, and in accordance with this embodiment of the present invention the presence of a vertical mark on the leading edge of a handwritten letter is utilized in its identification. The "four dot" method of controlling the hand writing of alphabetical letters utilized with the previous embodiment described in connection with FIG. 5 may also be utilized in the present embodiment. As shown in FIG. 8, the defined writing area LWB contains four guide dots GD1 through GD4, and the writer is instructed to form the letters of the alphabet around these guide dots in the manner shown for the individual letters in FIG. 10. Guide dots GD4 and GD3 may advantageously be eliminated and in their place a dotted line LD as shown in FIG. 9 may be utilized as a guide in the writing of the letters in defined writing area LWB'. The writer is instructed to write the thirteen letters whose leading edges are a straight line so that this straight line is to the left of the dotted line LD shown in FIG. 9 or to the left of guide dots GD3 and GD4 shown in FIG. 8. Illustrative criterion areas utilized in the manner described hereinbefore to uniquely identify the handwritten letters are shown dotted in FIGS. 8 and 9 and are designated $a$ through $g$ and $v$. By employing the method of forming the letters shown in FIG. 10, the number of criterion areas required to individually identify the handwritten letters is advantageously reduced as only a single criterion area designed $v$ is required to detect the presence of a vertical line to the left of guide dots GD3 or GD4 shown in FIG. 8 or to the left of the dotted line LD shown in FIG. 9.

The table of FIG. 10 further shows the criterion areas $a$ through $g$ and $v$ traversed when the alphabetical letters "A" through "Z" are written by hand in defined writing areas of the type shown in FIG. 8 or 9. The "X's" and blanks in the various criterion area columns indicate respectively that a particular criterion area was traversed or was not traversed when a particular letter was written. Certain of the criterion area columns have an X/O shown for a particular letter. This indicates that the particular letter may be distinctly identified whether or not the criterion area is traversed and thus is redundant. For example, the letters "B," "E" and "F," and others as shown may be identified as "B," "E" or "F," etc., whether or not the criterion area $e$ was traversed. It will be noted, referring to the table of FIG. 10, that each of the alphabetical letters traverses a different and distinctive combination of criterion areas in the defined writing area, and thus the detection or determination of the particular areas which are traversed uniquely identifies the handwritten letter. As shown in the table of FIG. 10, the crossing of certain criterion areas, for example those identifying the letters "K," "T" and "Y," permits the letters "K," "T" and "Y" to be distinctly identified in a number of different ways, and thus considerable latitude is available to the writer in the writing of the handwritten letters.

In a manner described hereinbefore, the boundaries defining writing area LWB or LWB' shown in FIGS. 8 and 9 respectively may advantageously be eliminated provided each group of guide dots GD1 through GD4 shown in FIG. 8, or provided the guide dots GD1 and GD2 and associated dotted line LD shown in FIG. 9 for each individual letter, are spaced far enough from adjacent guide dots GD1 through GD4 or guide dots GD1, GD2 and line LD for other letters to insure that a letter handwritten on one set of guide dots will not traverse the criterion areas associated with an adjacent set of guide dots.

Arabic numerals and alphabetical letters written in the manner described hereinbefore are advantageously adapted for subsequent automatic reading by simple, economical and reliable readers. One embodiment illustrating the manner in accordance with the present invention in which such handwritten alphabetical letters and Arabic numerals may advantageously be read is depicted in FIG. 11. The illustrative document reader disclosed in FIG. 11 comprises a base BA, a reading head HD hinged to base BA by hinge HG or in any other suitable manner, and a translator TR. Base BA may be constructed of any suitable material and is provided with two pins P1 and P2 protruding upwardly a slight distance from base BA. Pins P1 and P2 are spaced apart to correspond to the spacing between guide dots GD1 and GD2 shown in the defined writing area NWA in FIG. 1. For the purpose of this embodiment guide dots GD1 and GD2 in a defined writing area such as NWA shown in FIG. 1 are perforations in the defined writing area and the writer will hand write the Arabic numerals desired to be subsequently automatically read by utilizing a pencil containing electrically conductive material or a pen containing electrically-conducting ink. When a defined writing area such as NWA shown in FIG. 1 is placed upon base BA as shown in FIG. 11, pins P1 and P2 will protrude upwardly through guide dot holes GD1 and GD2 and accordingly the defined writing area NWA will be positioned to a predetermined location by pins P1 and P2.

Head HD may be constructed of any suitable insulating material, and as shown in FIG. 11 head HD has two holes or depressions H1 and H2 adapted to fit over pins P1 and P2 protruding upwardly from base BA when head HD is closed or lowered upon base BA. Head HD also has a plurality of conducting segments secured thereto in any suitable manner as, for example, by well known printed wiring techniques. These conducting segments are designated SA1 through SG1 and SA2 through SG2 and are utilized in the manner described hereinafter to detect the presence of a conductive pencil mark or conductive ink trace in predetermined criterion areas such as areas $a$ through $g$ in defined writing area NWA shown in FIG. 1. Segments SA2 through SG2 are electrically interconnected by conductive rings R1 and R2 which encircle holes H1 and H2 in head HD. Segment SA2 is connected to a source of potential P which may advantageously be an alternating current source of potential or a direct current source of potential of any desired polarity. The potential applied to segment SA2 is in turn applied to the other segments SB2 through SG2 via rings R1 and R2. Associated with each of the segments SA2 through SG2 is a respective mate segment SA1 through SG1 spaced a slight distance therefrom as shown in FIG. 11. Each of the segments SA1 through SG1 is in turn connected via a respective conductor A through G to translator TR.

When a document with a defined writing area such as area NWA shown in FIG. 1 upon which an Arabic numeral has been handwritten in the manner described hereinbefore, is placed on base BA over pins P1 and P2 and head HD is lowered in order that the pairs of segments SA1—SA2 through SG1—SG2 contact the surface of the writing area, the presence of a conducting trace or a conducting pencil mark on defined writing area NWA will cause a potential to be applied between each pair of segments which the trace or pencil mark traverses. For example, if the Arabic numeral "2" has been handwritten on writing area NWA as shown in FIG. 11, a potential will applied from segment SA2 to segment SA1 and from there via conductor A to translator TR. Similarly, a potential will be applied from segment SB2 to segment SB1 and by way of conductor B to translator TR. It will thus be observed that the handwritten Arabic numeral "2" will cause a potential to be applied to conductors A, B, G, E and D to translator TR when head HD is lowered over the defined writing area NWA upon which the numeral is handwritten.

Translator TR translates the potential combinations present on leads A through G to provide a single potential output on one of leads 0 through 9 in accordance with the Arabic numeral read. Thus when the handwritten Arabic numeral "2", for example, is read by the conductive methods described above, the reading thereof will provide a potential on output conductor 2 from translator TR. Translators which may advantageously be employed for translator TR in the combination of the present invention are well known in the art. If speed of translation or speed of reading is not a critical requirement, translators utilizing the well known relay tree arrangement may advantageously be employed. On the other hand, if speed of translation is a critical requirement then translators utilizing logical AND and OR gates in a manner well known in the art may advantageously be utilized.

Although the above-described embodiment illustrates the manner of automatically reading handwritten Arabic numerals, it is to be understood that the principles thereof may be applied equally to the automatic reading of alphabetical letters. Accordingly, the reading head HD illustrated in FIG. 11 and arranged to read handwritten Arabic numerals in a defined writing area of the type illustrated in FIG. 1 may be modified in an evident manner in accordance with the present invention to read alphabetical letters in defined writing areas of the type illustrated in FIGS. 5, 8 or 9. It is to be further understood that the reading head and the manner of reading handwritten alpha-numeric characters is not limited to the reading of a single handwritten alphabetical letter or Arabic numeral at a time and that head HD illustrated in FIG. 11 may advantageously be modified to include a plurality of groups of conductive segments for simultaneously reading a plurality of alphabetical letters or Arabic numerals. Thus in accordance with the principles of the present invention a reading head adapted to simultaneously read all of the numerical information handwritten on the stock card illustrated in FIG. 4 or adapted to simultaneously read all of the handwritten alphabetical letters and Arabic numerals handwritten on a toll ticket of the type shown in FIG. 7 may advantageously be provided.

Another embodiment illustrating the manner in accordance with the present invention in which handwritten alphabetical letters and Arabic numerals may advantageously be automatically read is depicted in FIGS. 12 and 13. For the purpose of this embodiment the writer of handwritten Arabic numerals is instructed to write the numerals in the manner described hereinbefore on a priorly prepared writing surface of the type disclosed in FIG. 12. As shown in FIG. 12 this writing surface comprises a defined writing area of the type disclosed in FIG. 1 wherein the criterion areas $a$ through $g$ described hereinbefore in connection with FIG. 1 are physically defined by deposits of invisible or lightly visible conductive material on the surface of paper of other nonconductor. The areas of conductive material are shown shaded in FIG. 12 and are deposited on the surface of the writing paper in such a manner as to positively define the respective criterion areas. For example, the areas of conductive material which contain points $A_i$ and $A_o$ define criterion area $a$ therebetween. Similarly, the areas of conducting material containing points $B_o$ and $BC_i$ define criterion area $b$ therebetween. In a similar manner each of the remaining criterion areas $c$ through $g$ are defined by areas of conductive material deposited on the surface of the writing paper as shown in FIG. 12.

It will be noted that the defined writing area which is included in dotted rectangle Z also contains two guide dots GD1 and GD2. For the purpose of this embodiment guide dots GD1 and GD2 are perforations in the writing surface which as described hereinbefore will be utilized to position the defined writing area in the document reader of this embodiment. Further, for the purpose of this embodiment, the writer of the handwritten Arabic numerals is instructed to utilize a pencil containing conductive material or a pen containing conductive ink in the hand writing of Arabic numerals. It will be noted that when an Arabic numeral is handwritten on a defined writing area of the type illustrated in FIG. 12 the conductive trace or pencil mark made thereby will traverse the criterion areas $a$ through $g$ between areas of conductive material deposited on the writing surface. For example, if the Arabic numeral "3" is handwritten in this manner as shown in FIG. 12, a conductive trace will traverse criterion area $a$ and will electrically interconnect the areas of conductive material containing points $A_i$ and $A_o$. Similarly, a conductive trace will traverse criterion area $b$ and will electrically interconnect the areas of conductive material containing points $B_o$ and $BC_i$. In a similar manner the conductive trace will traverse criterion areas $g$, $c$ and $d$ and will electrically interconnect the respective areas of conductive material containing points $EFG_i$ and $G_o$, the areas containing points $BC_i$ and $C_o$, and the areas containing points $D_i$ and $D_o$. In accordance with the principles of the present invention the particular criterion areas traversed by a handwritten Arabic numeral may be detected by applying a potential to the areas of conductive material containing points $A_i$, $BC_i$, $D_i$, and $EFG_i$, and then detecting the areas of conductive material on which a resulting potential appears when a conductive trace traverses particular criterion areas.

The manner in which Arabic numerals handwritten on a defined writing area of the type illustrated in FIG. 12 may advantageously be read is depicted in FIG. 13. FIG. 13 is a modification of the document reader described hereinbefore in connection with FIG. 11 and contains a base BA, a reading head HD hinged to base BA by hinge HG or in any other suitable manner and translator TR. Base BA is similar to base BA described in connection with FIG. 11 and contains two pins P1 and P2 protruding upwardly a slight distance from base BA. When a document containing a defined writing area of the type shown in FIG. 12 is placed on base BA over pins P1 and P2 as shown in FIG. 13, these pins will, in the manner described hereinbefore, position the defined writing area to a predetermined position with respect to reading head HD. Head HD shown in FIG. 13 may be constructed of any suitable insulating material and contains a plurality of conducting pins which are adapted to contact the conductive areas deposited on the defined writing surface shown in FIG. 12 when head HD is lowered or closed upon the writing surface. For example, pins $PA_i$ and $PA_o$ will contact respective points $A_i$ and $A_o$ in the conductive areas illustrated in FIG. 12 which define criterion area $a$. Similarly, other pins shown in head HD will contact the conductive areas of the defined writing surface which define the remaining criterion areas $b$ through $g$. Conductive pins $PEFG_i$, $PA_i$, $PBC_i$, and $PD_i$ are electrically interconnected and connected to a source of potential P which may advantageously be an alternating current source of potential or a direct current source of potential of any desired polarity. Pins $PA_o$, $PB_o$, $PC_o$, $PD_o$, $PE_o$, $PF_o$, and $PG_o$, are connected respectively to leads A through G leading to translator TR. Accordingly, when head HD is lowered so that the pins secured therein contact the areas of conductive material deposited on the defined writing surface, the particular criterion areas traversed by the conductive pencil mark or ink trace will cause potentials to be selectively applied to leads A through G to translator TR. In the manner described hereinbefore, translator TR translates the potential combinations present on leads A through G to provide a single potential output on one of leads 0 through 9 in accordance with the Arabic numeral read.

It is to be understood that the above-described embodiment is not limited to the reading of Arabic numerals and head HD illustrated in FIG. 13 may advantageously be arranged to read handwritten alphabetical letters written in defined writing areas of the type illustrated in FIGS. 5, 8, or 9, when such areas are priorly adapted for automatic reading in this manner by deposits of invisible or lightly visible conductive material on the surface of the defined writing area. It is to be further understood that the above-described embodiment shown in FIGS. 12 and 13 is not limited to the reading of a single handwritten alphabetical letter or Arabic numeral at a time and that the document reader illustrated in FIG. 13 may advantageously be modified to include a plurality of groups of conductive pins for simultaneously reading a plurality of alphabetical letters and Arabic numerals.

With the hand writing of alpha-numeric characters in a machine-readable language possible in accordance with the present invention as described hereinbefore, another important aspect of the present invention is directed to a real time reader for automatically reading such handwritten alpha-numeric characters while they are being written. One illustrative embodiment of such a real time reader for reading Arabic numerals is disclosed in FIG. 14 and includes a platen PL constructed of any suitable insulating material in which a plurality of electrically conductive segments designated SA through SG and SRS are embedded, a memory circuit MC connected by means of conductors A through G and RS to the respective conductive segments embedded in platen PL, a logic circuit LC for translating the output of memory circuit MC, a utilization circuit UC connected by means of conductors 0 through 9 to the output of logic circuit LC and by means of conductor RS to segment SRS in base BA, and an electrically conducting stylus ST connected to a source of potential P by means of flexible conductor WL. As shown in FIG. 14 the electrically conductive segments SA through SG are embedded in platen PL about guide dots GD1 and GD2 in an arrangement which is similar to the arrangement of the criterion areas $a$ through $g$ in defined writing area NWA shown in FIG. 1.

In accordance with this aspect of the present invention, numerical information may advantageously be directly communicated to utilization circuit UC which for example may be a computer or data processing system by describing the desired Arabic numerals on platen PL around guide dots GD1 and GD2 in the manner illustrated in FIG. 2 with stylus ST. As stylus ST traverses the respective conductive segments SA through SG on platen PL a potential will be applied to the corresponding leads A through G extending to memory circuit MC. Memory circuit MC may advantageously comprise relays or conventional flip-flop circuits which will store or register indications of the particular segments SA through SG traversed when an Arabic numeral is described on platen PL. When an Arabic numeral has been described in this manner on platen PL the outputs of memory circuit MC are translated by logic circuit LC to provide a single potential output on one of leads 0 through 9 to utilization circuit UC corresponding to the particular Arabic numeral described. For example, when the Arabic numeral "2" is described on platen PL with stylus ST in the manner illustrated in FIG. 2, conductive segments SA, SB, SG, SE and SD will be successively traversed. The traversing of these particular segments will cause potentials to be successively applied to leads A, B, G, E and D to memory circuit MC. The output of memory circuit MC is applied to logic circuit LC which translates the information stored in memory circuit MC and provides a single output potential on conductor 2 to utilization circuit UC.

After each Arabic numeral has been described on platen PL, and before a succeeding numeral is described, stylus ST will be applied to segment SRS on platen PL. The SRS segment is a reset segment and will apply a potential over lead RS to memory circuit MC to effect the release or clearing of this circuit in preparation for the recording of the conductive segments traversed when a succeeding Arabic numeral is described. A potential on the RS lead is also applied to utilization circuit UC to indicate that a complete Arabic numeral has been described.

An illustrative embodiment of the memory circuit MC, the logic circuit LC, and the utilization circuit UC, is shown in FIG. 15. As disclosed in FIG. 15, memory circuit MC comprises a plurality of flip-flop circuits designated FF-A through FF-G. Each of these flip-flops has two outputs, one designated the "0" output lead and one designated the "1" output lead. The shaded corner of the flip-flop indicates the plate of the normally conducting stage of the flip-flop circuit. Accordingly, when flip-flop FF-A, for example, is normal the $A_0$ output lead will have a negative signal potential applied thereto and the $A_1$ output lead will have a positive signal potential applied thereto. The respective flip-flops in memory circuit MC are operated by potentials applied over leads A through G from the respective segments SA through SG on platen PL. Thus when the Arabic numeral "2", for example, is described on platen PL and a potential is successively applied over leads A, B, G, E, and D, the corresponding flip-flops FF-A, FF-B, FF-G, FF-E, and FF-D will be actuated. The operation of flip-flop FF-A will cause a positive signal potential to be applied over the $A_1$ output lead and a negative signal potential over the $A_0$ output lead to logic circuit LC. Similarly, the "0" output leads of the operated flip-flops will have a positive signal voltage applied thereto and the "1" output leads of the operated flip-flops will have a negative signal voltage applied thereto. Furthermore, the "0" output leads of the unoperated flip-flops will have a negative signal voltage applied thereto and the "1" output leads of the unoperated flip-flops will have a positive signal voltage applied thereto.

The signal voltage present on the "1" and "0" leads from the respective flip-flops of memory circuit MC are translated by logic circuit LC. As shown in FIG. 15, logic circuit LC comprises a plurality of logical AND and OR gate circuits. These AND and OR gate circuits are responsive to negative signal voltages and accordingly will translate the voltage combinations present on the otuput leads of memory circuit MC to provide a single output on one of the output leads 0 through 9 from logic circuit LC to utilization circuit UC. Returning again to the above example where the Arabic numeral "2" was described on platen PL shown in FIG. 14, leads $A_1$, $B_1$, $G_1$, $E_1$, and $D_1$ from the output of memory circuit MC will have a negative signal voltage applied thereto. Likewise, leads $C_0$ and $F_0$ will have a negative signal voltage applied thereto. The negative signal voltages on lead $F_0$ and lead $D_1$ are combined in AND gate 151 which in turn applies a negative signal voltage to one input of AND gate 152. The other input of AND gate 152 is connected to the $A_1$ lead which has a negative signal voltage applied thereto, and accordingly AND gate 152 will be actuated to apply a negative signal voltage to one input of AND gate 153. The other input of AND gate 153 is connected to the $B_1$ lead which has a negative signal voltage applied thereto, and accordingly AND gate 153 will be actuated to apply a negative signal voltage to one input of AND gate 154. The other input of AND gate 154 is connected to the $C_0$ lead which as indicated above has a negative signal voltage applied thereto, and accordingly AND gate 154 will be actuated to apply a negative signal voltage to one input of AND gate 155. The other input of AND gate 155 is connected to the $G_1$ lead which has a negative signal voltage applied thereto and AND gate 155 will be actuated to apply a negative signal voltage to the output conductor 2 to utilization circuit UC.

After the Arabic numeral "2" has been described on platen PL in the manner described hereinbefore and the respective conductive segments SA through SG traversed thereby are stored in memory circuit MC and the translation thereof has been completed in logic circuit LC to provide the single output potential on the output lead 2 extending to utilization circuit UC, the application of stylus ST to the SRS segment on platen PL in FIG. 14 causes a signal to be applied over the RS lead to memory circuit MC. As shown in FIG. 15 this signal will cause the resetting of the operated flip-flops FF-A through FF-G in memory circuit MC which will clear memory circuit MC and prepare the circuit for recording indications of the conductive segments traversed when a succeeding Arabic numeral is described on platen PL. A signal potential will also be applied over lead RS to utilization circuit UC to indicate that a complete numeral has been described. Memory circuit MC and logic circuit LC shown in FIG. 15 operate in a similar manner in response to the describing by hand of any of the Arabic numerals "0" through "9" on platen PL with stylus ST shown in FIG. 14.

Figure 16:
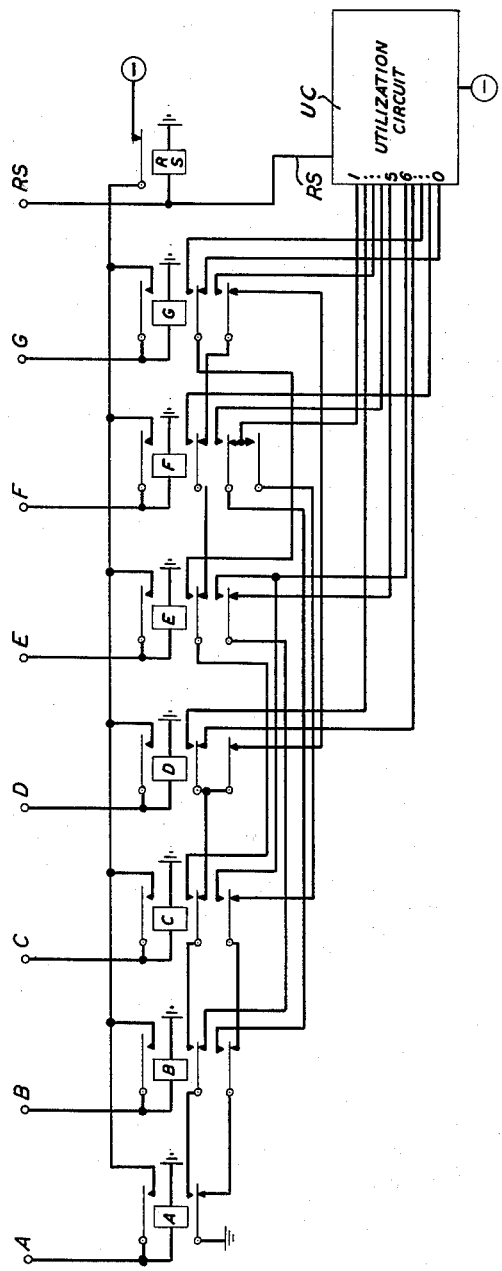
FIG. 16 depicts an illustrative embodiment of a relay translater employable in the combination of the real time reader of FIG. 14.

Another illustrative embodiment of a circuit which may be utilized for memory circuit MC and logic circuit LC shown in FIG. 14 is depicted in FIG. 16. As illustrated in FIG. 16 each of the input leads A through G and RS which connect to respective segments SA through SG and SRS in the platen PL of FIG. 14 extend through the winding of a corresponding relay A through G and RS to ground. The particular ones of leads A through G which have a potential applied thereto when stylus ST traverses the segments SA through SG on platen PL will result in the operation of the corresponding relays A through G. For example, if the Arabic numeral "2" is described on platen PL with stylus ST in the manner indicated above, a potential will be successively applied to leads A, B, G, E, and D. These potentials will cause the operation of the associated relays A, B, G, E, and D which lock operated to battery through a back contact of the RS relay shown in FIG. 16. With the A, B, G, E, and D relays operated when the Arabic numeral "2" is described, ground may be traced through a front contact and armature of the operated A relay, through a front contact and armature of the operated B relay, through a back contact and armature of the normal C relay, through a front contact and armature of the operated D relay to output lead 2 extending to utilization circuit UC. It will be noted that the operation of the E and the G relays in response to the describing of the Arabic numeral "2" is redundant and is not used for this particular operation. Accordingly, the relays A through G and their associated contacts provide both the memory for storing the indications of which of the particular conductive segments SA through SG are traversed when an Arabic numeral is described by hand on platen PL with stylus ST and translates these indications into single potential (ground in this illustrative embodiment) on one of the output leads 0 through 9 corresponding to the Arabic numeral described. When stylus ST shown in FIG. 14 is applied to the SRS segment on platen PL the potential on the RS lead shown in FIG. 16 will cause the operation of the RS relay. The operation of the RS relay will in turn release the operated ones of the relays A through G and will return the circuit to normal in prepartion for automatically reading a succeeding handwritten Arabic numeral. A signal potential is also applied over the RS lead to utilization circuit UC to indicate that the translation of one numeral has been completed.

Figure 17:
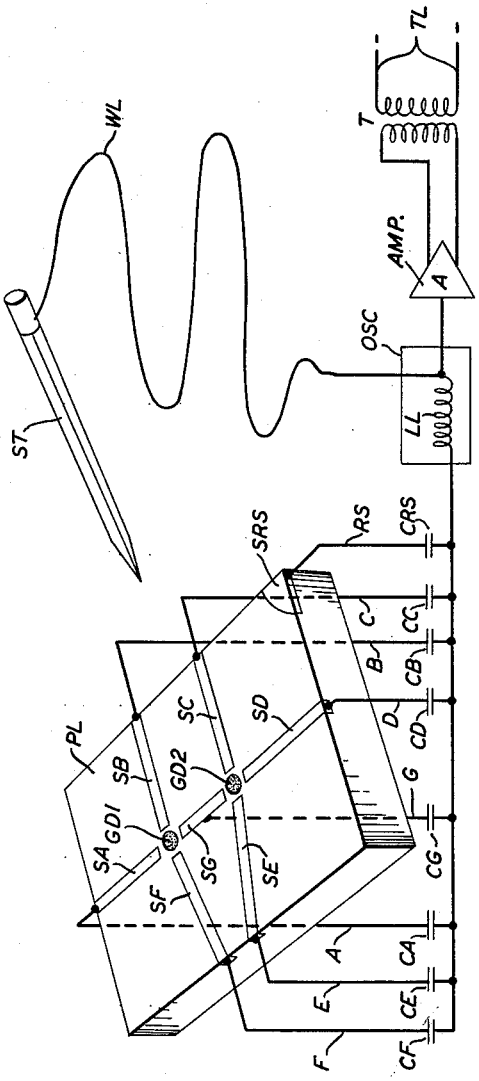
FIG. 17 depicts an illustrative embodiment of a real time reader in accordance with the present invention for automatically reading handwritten Arabic numerals while they are being written and producing a plurality of distinctive frequency signals corresponding thereto.

Another illustrative embodiment of a real time reader in accordance with the present invention for automatically reading handwritten Arabic numerals while such numerals are being written is depicted in FIG. 17. The embodiment shown in FIG. 17 comprises a platen PL constructed of any suitable insulating material in which a plurality of electrically conductive segments designated SA through SG and SRS are embedded around guide dots GD1 and GD2 in the same manner and in the same arrangement as segments SA through SG and SRS were embedded in platen PL shown in the embodiment of FIG. 14. Each of the segments SA through SG and SRS in platen PL shown in FIG. 17 are connected to an associated capacitor CA through CG and CRS by a respective conductor A through G and RS. As shown in FIG. 17, one terminal of each of the capacitors CA through CG and CRS is connected in common to the one terminal of inductance LL in oscillator OSC. Oscillator OSC may be any type of oscillator known in the art and inductance LL with the individual capacitors CA through CG and CRS comprise the tuned circuit of the oscillator. The other terminal of inductance LL is connected by means of flexible conductor W1 to conductive stylus ST.

The signal output of oscillator OSC is applied through amplifier AMP and transformer T to transmission line TL. Capacitors CA through CG and CRS are selected to have an appropriate capacity to cause oscillator OSC to generate a distinctive frequency signal when stylus ST electrically contacts each of the associated conductive segments SA through SG and SRS. For example, when stylus ST contacts conductive segment SA, the tuned circuit of oscillator OSC comprises inductance LL and capacitor CA, and oscillator OSC will generate a distinct predetermined frequency signal. This signal is amplified in amplifier AMP and applied to transmission line TL through transformer T. Similarly, when stylus ST contacts conductive segment SB, for example, the tuned circuit of oscillator OSC comprises inductance LL and capacitor CB, and oscillator OSC generates a different distinctive frequency signal which is amplified in amplifier AMP and applied to transmission line TL through transformer T.

In accordance with the illustrative embodiment of the present invention shown in FIG. 17 the writer is instructed to describe the Arabic numerals on platen PL in the manner similar to that shown in FIG. 2 and discussed above in connection with FIG. 14, and in so doing stylus ST will successively contact different conductive segments on platen PL. For example, if the Arabic numeral "2" is described by hand in this manner about guide dots GD1 and GD2 on platen PL, conductive segments SA, SB, SG, SE, and SD will be successively traversed by stylus ST. As each of these segments is traversed by stylus ST, oscillator OSC will generate a different distinctive frequency signal corresponding to the particular segment traversed and a succession of distinctive frequency signals will be applied to transmission line TL. These signals may advantageously be filtered at the receiving end of line TL so that the various frequency signals are distinctly separated in a manner well known in the art and applied to a memory circuit and logic circuit of the type described hereinbefore in connection with FIG. 14.

In a similar manner, after an Arabic numeral has been described on platen PL, stylus ST may then be placed in contact with the SRS reset segment on platen PL shown in FIG. 17. The tuned circuit of oscillator OSC thereupon comprises capacitor CRS and inductance LL and oscillator OSC generates a distinctive frequency signal which is amplified by amplifier AMP and transmitted over transmission line TL as a reset signal. The reset signal will effect the resetting of the memory and logic circuitry utilized at the receiving end of line TL to translate the distinctive frequency signals characterizing the handwritten Arabic numeral previously received over the transmission line TL and gives an indication to a utilization circuit that one numeral has been completely described on platen PL at the transmitting end of the line.

Figure 18:
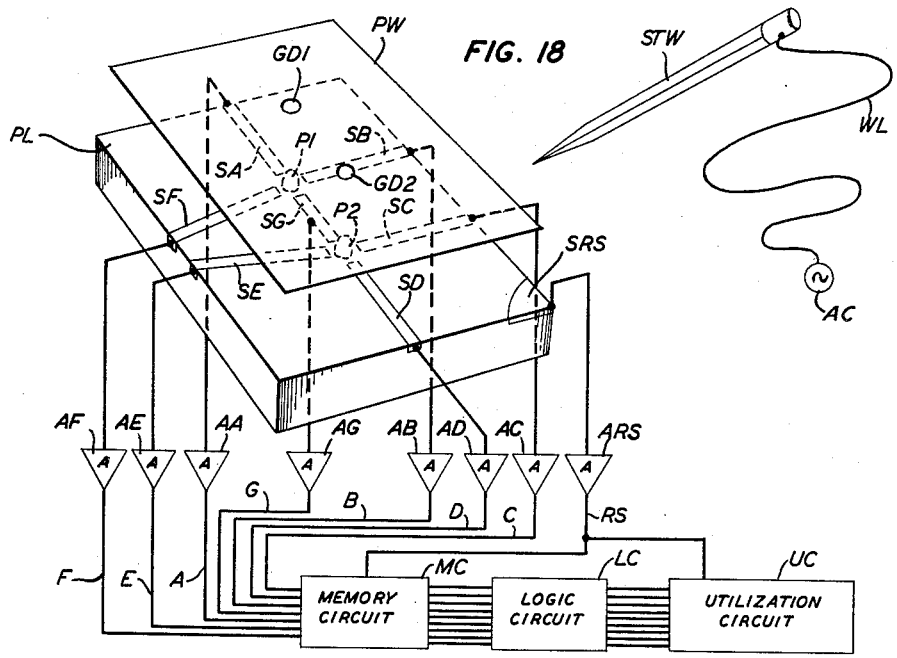
FIG. 18 depicts an illustrative embodiment of a real time reader of the type shown in FIG. 14 which is adapted to make a written record of the hand written Arabic numerals automatically read while such numerals are being written.

In accordance with another important aspect of the present invention, a real time reader of the type described above in connection with FIGS. 14 and 17 may advantageously be adapted for making a written record of the information communicated to a machine while the information is being described by hand on such a real time reader. Thus in accordance with this aspect of the present invention, it is possible to communicate alphabetical and numerical information to a machine such as a computer or data processing system by the hand writing of the numerical and alphabetical information in the manner described above and at the same time make a written record thereof. An illustrative embodiment of such a real time reader is depicted in FIG. 18 and comprises a platen PL constructed of any suitable insulating material in which a plurality of electrically conductive segments designated SA through SG and SRS are embedded around pins P1 and P2. In accordance with this aspect of the present invention, a sheet of writing paper PW, containing two guide holes GD1 and GD2, is positioned over the conductive segments on platen PL as shown in FIG. 18 by pins P1 and P2. The conductive segments SA through SG and SRS in platen PL are connected to memory circuit MC by respective conductors A through G and RS which extend through associated amplifiers AA through AG and ARS. Stylus STW with which the writer will describe by hand the handwritten Arabic numerals on paper PW comprises a pencil containing electrically conductive lead or a pen containing electrically conductive ink. An electrical connection between the conductive writing material in stylus STW and a source of an alternating current signal designated AC is provided by flexible conductor WL.

In accordance with this illustrative embodiment of the present invention, the writer is instructed to describe the Arabic numerals on paper PW with respect to pins P1 and P2 which protrude upwardly through guide holes GD1 and GD2 in paper PW in the manner shown in FIG. 2 and discussed above in connection with FIG. 14. When an Arabic numeral is described by hand on writing paper PW in this manner, stylus STW will leave a visible trace of the character described on the paper, and as stylus STW traverses the respective conductive segments SA through SG while the character is being described an alternating current signal will be capacitively coupled through the paper to the conductive segments traversed by stylus STW. The alternating current signal capacitively coupled to each of the respective conductive segments traversed is in turn amplified in respective amplifiers AA through AG and applied to memory circuit MC. The output of memory circuit MC is translated in the manner described hereinbefore in logic circuit LC and applied to utilization circuit UC. For example, if the Arabic numeral "2" is described by hand with stylus STW on writing paper PW which covers platen PL, stylus STW will deposit a visible trace of the Arabic numeral "2" on paper PW at the same time an alternating current signal will be capacitively coupled to conductive segments SA, SB, SG, SE and SD as stylus STW successively traverses these conductive segments in platen PL. In response to the amplified alternating current signals applied to leads A, B, G, D and E, memory circuit MC will register or store indications of which of the respective segments were traversed when the Arabic numeral "2" was described by hand on platen PL. Logic circuit LC will translate the outputs of memory circuit MC to provide a single potential on output lead 2 to utilization circuit UC in the manner described hereinbefore.

Memory circuit MC and logic circuit LC are reset to normal or cleared in the manner described hereinbefore when stylus STW is placed in contact with reset segment SRS or when an alternating current signal is capacitively coupled from stylus STW to segment SRS through paper PW. The resulting alternating current signal is amplified in amplifier ARS and applied via lead RS to memory circuit MC to effect a clearing of this circuit. A signal potential is also applied over lead RS to utilization circuit UC as an indication that one numeral has been written and translated.

Although the above-described embodiments of the real time reader as shown in FIGS. 14, 17 and 18 illustrate the manner of automatically reading handwritten Arabic numerals while these numerals are being written, it is to be understood that the principles thereof may be applied equally to the automatic reading of alphabetical letters while such letters are being handwritten. Accordingly, platen PL illustrated in FIGS. 14, 17 or 18 and arranged for the reading of handwritten Arabic numerals while they are being written may be modified in an evident manner in accordance with the present invention to permit the reading of alphabetical letters described thereon while such letters are being written. Platen PL shown in FIGS. 14, 17 or 18 may thus be advantageously modified to include conductive segments arranged in accordance with the arrangement of the criterion areas shown in FIGS. 5, 8 or 9, and the memory circuit MC and the logic circuit LC may advantageously be modified in a manner known in the art to adapt the modified platen PL for the automatic reading of handwritten alphabetical letters while such letters are being written. It is to be further understood that the platens PL and associated memory circuits MC and logic circuits LC shown in FIGS. 14, 17 and 18 may advantageously be arranged in accordance with this invention for a plurality of alphabetical letters and/or Arabic numerals. Accordingly groups of alpha-numeric characters, for example, words or plural digit numbers, may be communicated to a machine a word at a time or a number at a time by the hand writing thereof.

Figure 19:
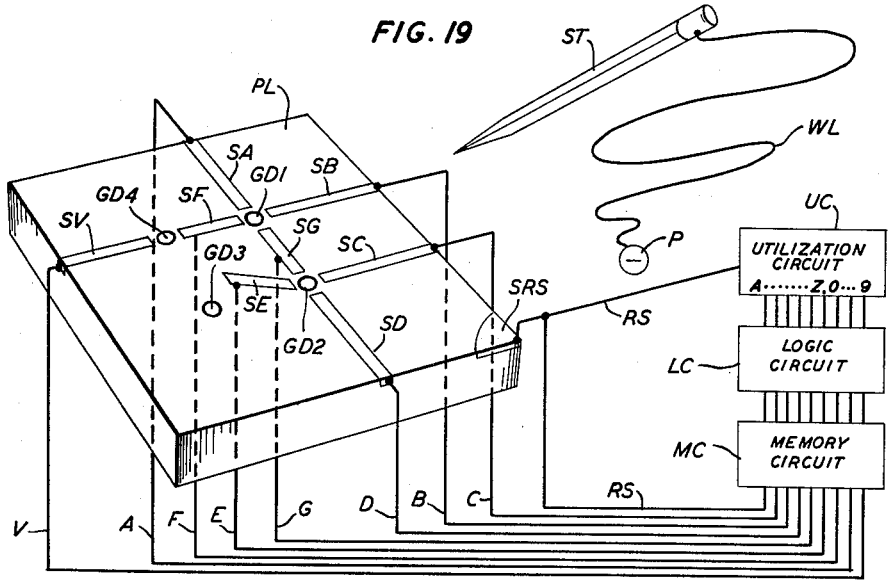
FIG. 19 depicts an illustrative embodiment of a real time reader in accordance with the present invention for automatically reading alpha-numeric characters while such characters are being written.

One illustrative embodiment of a real time reader of the type described above in connection with FIGS. 14, 17 and 18 and adapted in accordance with the present invention for the automatic reading of alpha-numeric characters while these characters are being written is depicted in FIG. 19. It will be observed that platen PL shown in FIG. 19 is similar to platen PL shown in FIGS. 14, 17 or 18, except that two additional guide dots GD3 and GD4 are provided thereon and an additional conductive segment designated SV is embedded therein. The arrangement of conductive segments SA through SG and SV corresponds to the arrangement of criterion areas a through g and v shown in deferred writing area LWB in FIG. 8. Each of the conductive segments SA through SG, SV and SRS in platen PL shown in FIG. 19 is electrically connected to memory circuit MC in the manner described above by a respective lead A through G, V and RS. This embodiment of the real time reader for automatically reading alpha-numeric characters also includes an electrically conducting stylus ST connected to a source of potential P by flexible conductor WL. The output of memory circuit MC is translated by a logic circuit LC which applies a single potential to one of the output leads A through Z or 0 through 9 in accordance with the particular alpha-numeric character described by hand on platen PL.

The writer is instructed to describe alphabetical letters on platen PL about guide dots GD1 through GD4 in a manner similar to that shown in FIG. 10. Thus the thirteen alphabetical letters whose leading edges are straight lines will be described on platen PL with the vertical leading edge of these letters traversing conducting segment SV and to the left of guide dots GD3 and GD4. The writer is also instructed to describe Arabic numerals on plate PL shown in FIG. 19 about guide dots GD1 and GD2 in the manner similar to that shown in FIG. 2.

Memory circuit MC and logic circuit LC may advantageously comprise a plurality of flip-flop circuits and a combination of AND and OR gate circuits of the type utilized in FIG. 15 described hereinbefore. A "shift" signal indicating a shift from Arabic numerals to alphabetical letters may advantageously be transmitted to memory circuit MC from platen PL by contacting stylus ST with a combination of the conductive segments on platen PL not utilized in the automatic reading of alphabetical letters and Arabic numerals. For example, the contacting of stylus ST to conductive segment SD alone followed by the contacting of stylus ST on the SRS conductive segment may advantageously comprise a signal to memory circuit MC that the succeeding characters to be described are alphabetical letters, and similarly the contacting of stylus ST on conductive segment SA followed by the contacting of stylus ST on segment SRS may advantageously apply a signal to memory circuit MC to indicate that the succeeding characters to be described are Arabic numerals. The shift signals produced in this manner and the signal voltage applied to the respective leads A through G, V and RS, when alpha-numeric characters are described on platen PL are stored in the manner described hereinbefore by memory circuit MC to provide combinations of output potentials which logic circuit LC may translate to provide an output signal in accordance with the character described. The table of FIG. 10 shows illustrative logical functions required for the translation of alphabetical letters, and the table of FIG. 3 shows illustrative logical functions required for the translation of Arabic numerals. These logical functions may be provided by a combination of AND and OR gates in the manner known in the art or by conventional relay type translators.

Figure 20:
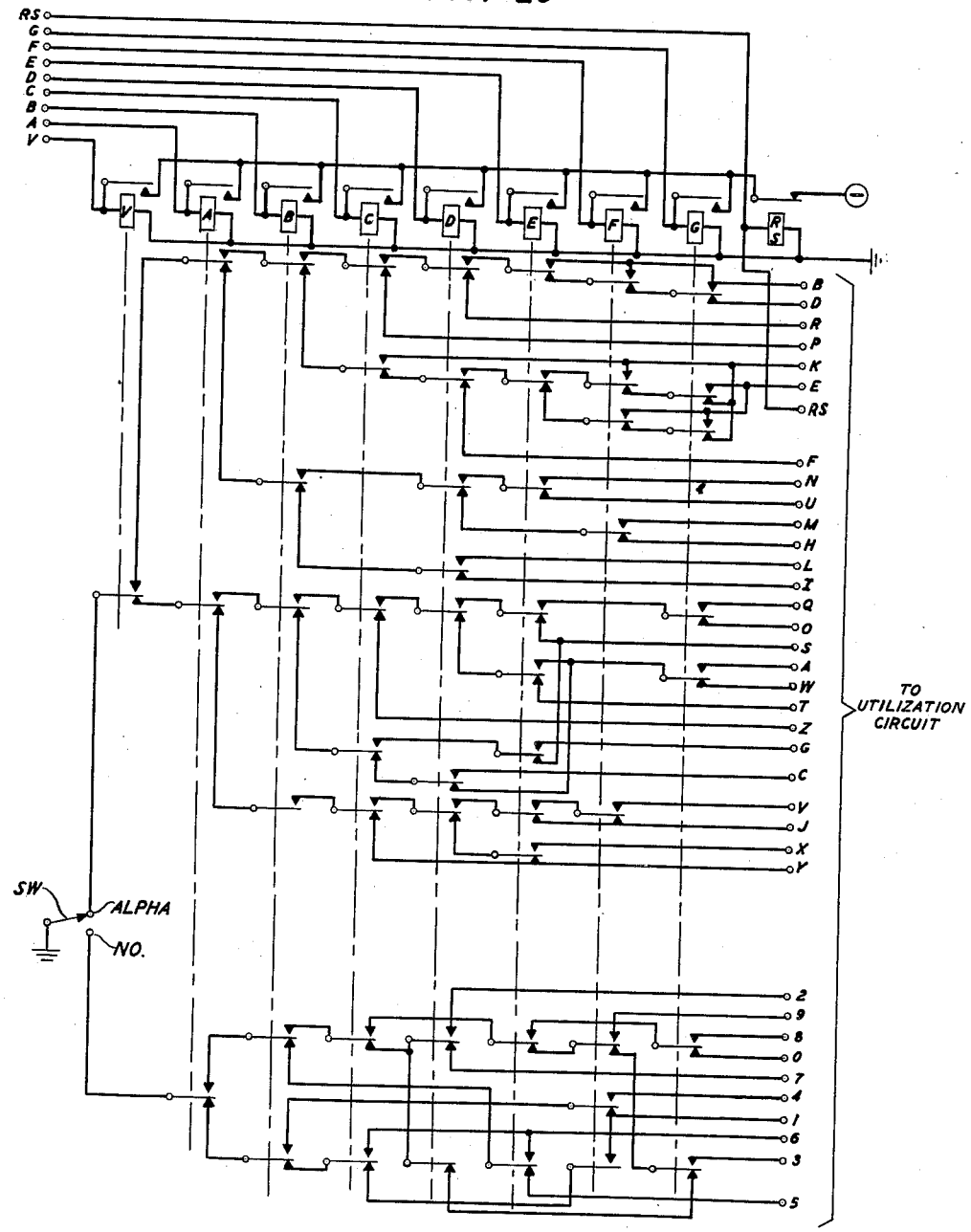
FIG. 20 depicts an illustrative embodiment of a relay translator employable in the combination of the real time reader of FIG. 19.

An illustrative embodiment of a relay translator which may advantageously be utilized for circuit MC and logic circuit LC shown in FIG. 19 to automatically read alpha-numeric characters described by hand on platen PL is depicted in FIG. 20. As shown in FIG. 20, each of the leads A through G, V and RS which connect to respective segments SA through SG, SV and SRS in platen PL of FIG. 19 extends through the winding of a corresponding relay A through G, V and RS to ground. The particular ones of leads A through G and V which have a potential applied thereto when stylus ST traverses the corresponding segments on platen PL will result in the operation of the corresponding relays. These relays when operated, lock operate to battery through a back contact of the RS relay which is utilized in the manner described hereinbefore in connection with FIG. 16 to reset or clear the circuit in preparation for registering the conductive segments traversed by stylus ST when a subsequent alpha-numeric character is described. As shown in FIG. 20, a toggle switch SW is provided to supply the "shift" signal which identifies the succeeding characters to be described as alphabetical letters or Arabic numerals. If switch SW is set to the "Alpha" position the particular conductive segments traversed on platen PL thereafter are translated into alphabetical letters by the contacts of the respective relays A through G and V. On the other hand, if switch SW is operated to the "No." position the conductive segments traversed thereafter are translated into Arabic numerals by the contacts of the respective relays A through G. The arrangement of the contacts of relay A through G and V shown in FIG. 20 are in accordance with the logical functions shown in the table of FIG. 10 for alphabetical letters and similar to that shown in the table of FIG. 3 for Arabic numerals.

After each alpha-numeric character is described on platen PL, conductive stylus ST is placed in contact with the SRS reset segment as described hereinbefore which in turn causes the operation of the RS relay shown in FIG. 20 to release the operated ones of relays A through G and V and thus clear the circuit in preparation for receiving the indications of the conductive segments traversed when a subsequent alpha-numeric character is described on platen PL. A signal potential is also applied over the RS lead to the utilization circuit to indicate that the reading and translation of one alpha-numeric character has been completed.

It is to be understood that the above-described arrangements are illustrative of the application of the principles of the present invention. Numerous other arrangements may be devised by those skilled in the art without departing from the spirit and scope of the invention.

What is claimed is:

1. A real time reader for handwritten alpha-numeric characters comprising in combination means defining an area for the describing thereon of said alpha-numeric characters, means in said area defining visible indicia with respect to which said characters are described, a plurality of conductive segments in said area, a stylus for the manual describing of said characters on said area, said stylus including an electrically conductive element having a potential applied thereto, detecting means for detecting particular ones of said segments traversed by said stylus as said characters are described on said area, said detecting means including means for detecting the potential applied to particular ones of said segments as said characters are described on said area, and means controlled by said detecting means for producing coded signals distinctly identifying said characters.

2. A combination defined in claim 1 wherein said means controlled by said detecting means comprises translating means responsive to the potential applied to said particular ones of said segments for producing a signal potential distinctly identifying said character.

3. A real time reader for handwritten alpha-numeric characters comprising in combination means defining an area for the describing thereon of said alpha-numeric characters, means in said area defining visual indicia with respect to which said characters are described, a plurality of conductive segments in said area, an electrically-conductive stylus for the manual describing of said characters on said area, a source of potential, means connecting said source and said stylus, means responsive to the potential applied to said segments by said stylus for identifying the particular ones of said segments traversed by said stylus as said characters are described on said area, and translating means controlled by said last-named means for generating coded signals indicating which of said characters were written on said area.

4. A real time transmitter for handwritten alpha-numeric characters comprising in combination means defining an area for the describing thereon of said alpha-numeric characters, means in said area for defining visual indicia with respect to which said characters are described, an electrically-conductive stylus for the manual describing of said characters on said area, a signal generator, and means including said stylus for controlling said generator to successively generate a plurality of distinct frequency signals identifying said characters as said characters are described on said area.

5. A real time transmitter for alpha-numeric characters comprising in combination means defining an area for the describing thereon of said alpha-numeric characters, means in said area defining visual indicia with respect to which said characters are described, a plurality of conductive segments in said area, an electrically-conductive stylus for the manual describing of said characters on said area, a signal generator, and means including said stylus for controlling said generator to generate successively a plurality of distinctive frequency signals respectively identifying each of the characters described on said area by said stylus as said characters are described.

6. The combination defined in claim 5 wherein said signal generator comprises an oscillator having an inductance in the tuned circuit thereof, wherein said stylus is connected to one terminal of said inductance, and wherein said means including said stylus for controlling said generator comprises a plurality of capacitors, one terminal of each of said capacitors being connected to a respective one of said segments and the other terminal of each of said capacitors being connected in common to the other terminal of said inductance.

7. The combination defined in claim 6 in combination with a transmission line and means for applying said distinctive frequency signals respectively identifying the particular ones of said segments traversed by said stylus to said transmission line.

8. The combination of means defining an area for the writing thereon of alpha-numeric characters, means in said area defining visible indicia with respect to which said characters are written, a plurality of electrically-conductive segments, means cooperating directly with said indicia alone in said area for positioning said area to a predetermined position with respect to said segments, an electrically-conductive stylus for the hand writing of said characters on said area, and means including said segments for producing coded signals distinctly identifying said characters hand written on said area with said stylus while said characters are being written.

9. The combination of means defining an area for the writing thereon of alpha-numeric characters, means in said area defining visible indicia with respect to which said characters are written, a plurality of electrically-conductive segments, means controlled by said indicia in said area for positioning said area to a predetermined position with respect to said segments, an electrically-conductive stylus for the hand writing of said characters on said area, said stylus depositing a visible trace of writing material on said area which defines said characters written thereon, a source of potential, means connecting said source and said stylus, means including said segments operative by electrical coupling through the surface of said area for producing signals identifying the particular ones of said segments traversed by said stylus as said characters are written on said area, storage means, means for storing in said storage means the signals identifying the particular ones of said segments traversed by said stylus as said characters are written on said area, and translating means for translating said signals stored in said storage means into coded signals distinctly identifying said characters.

10. The combination defined in claim 9 in combination with means controlled by said stylus for clearing said storage means.

11. The method of communicating alpha-numeric characters to a machine comprising the steps of describing said characters in a defined writing area, forming said characters with respect to a plurality of visible guide dots in said area, determining which of a plurality of predetermined portions of said area are traversed by said characters as said characters are described in said area, storing the determinations until said characters are completely described, converting the stored determinations into coded electrical signals distinctly identifying said characters and transmitting said signals to said machine.

12. The method defined in claim 11 comprising the further step of releasing said stored determinations to prepare for the communication of a subsequent character to said machine.

13. A method of communicating alpha-numeric characters to a machine and simultaneously making a written record thereof, comprising the steps of writing said characters in a defined writing area, indicating by electrical coupling through the surface of said area when predetermined portions of said area are traversed as said characters are written in said area, converting the indications into coded electrical signals distinctly identifying said characters, and transmitting said coded signals to said machine.

14. A real time alpha-numeric character reader comprising in combination means defining an area for the hand describing thereon of said characters, means in said area defining visible indicia with respect to which said characters are described, means defining a plurality of criterion areas in said area, means for describing said characters on said area, means for successively detecting the particular ones of said criterion areas traversed as said characters are described on said area, and means controlled by said detecting means for producing coded signals distinctly identifying said characters.

15. A real time reader for handwritten alpha-numeric characters comprising in combination means defining an area for the describing thereon of said characters, means in said area defining visible indicia with respect to which said characters are described, a plurality of conductive segments in said area, means for successively applying an electrical potential to particular ones of said segments as said characters are described in said area, a plurality of two-state devices each associated with a respective one of said segments, each of said devices operative to a first state in response to a potential applied to the associated one of said segments, a plurality of output leads each corresponding to one of said characters, and means controlled by said devices for applying a signal to the particular one of said output leads corresponding to the character described in said area.

16. The combination defined in claim 15 in combination with a further conductive segment in said area and means responsive to a potential applied to said further conductive segment to operate all of said two-state devices to a second state.

References Cited in the file of this patent

UNITED STATES PATENTS

| | | |
|---|---|---|
| 1,311,384 | Drew | July 29, 1919 |
| 2,143,875 | Hansell | Jan. 17, 1939 |
| 2,198,248 | Hansell | Apr. 23, 1940 |
| 2,685,611 | Taylor | Aug. 3, 1954 |
| 2,723,308 | Vroom | Nov. 8, 1955 |
| 2,741,312 | Johnson | Apr. 10, 1956 |
| 2,766,444 | Sheftelman | Oct. 9, 1956 |
| 2,964,734 | West | Dec. 13, 1960 |

OTHER REFERENCES

Publication I: "Scriptoscope Shows Messages on C-R Tube," by Hubby and Watson in Electronics, vol. 25, No. 7, July 1952, pp. 144–145.